Figure 1:
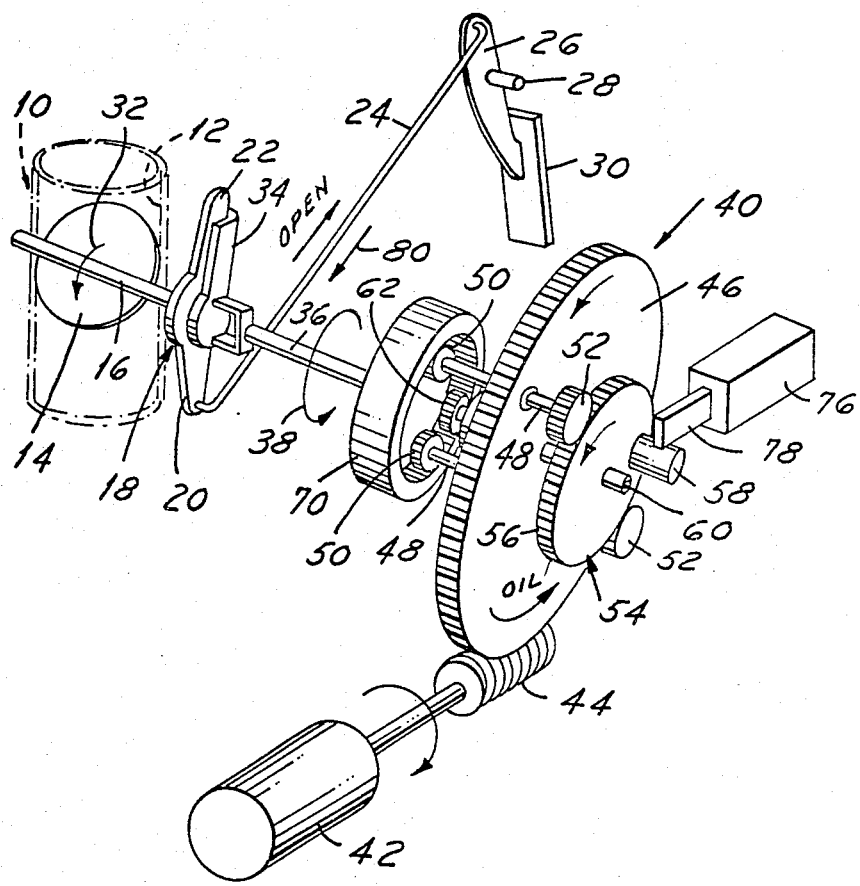

United States Patent [19]

Watanabe

[11] Patent Number: 4,526,060
[45] Date of Patent: Jul. 2, 1985

[54] CARBURETOR THROTTLE VALVE ACTUATOR

[75] Inventor: Shunso F. Watanabe, Livonia, Mich.

[73] Assignee: Ford Motor Company, Dearborn, Mich.

[21] Appl. No.: 425,825

[22] Filed: Sep. 28, 1982

[51] Int. Cl.³ ............................................. F02D 9/00
[52] U.S. Cl. ........................................ 74/626; 74/513; 74/781 R; 123/339; 123/349; 123/376
[58] Field of Search ............. 123/349, 363, 376, 396, 123/395, 400, 339; 74/626, 781 R, 513

[56] References Cited

U.S. PATENT DOCUMENTS

| | | | |
|---|---|---|---|
| 626,445 | 6/1899 | Smith | 74/781 R |
| 2,754,697 | 7/1956 | Luebking | 74/781 R |
| 2,929,369 | 3/1960 | Staege | 123/139 |
| 2,973,051 | 2/1961 | Teetor | 180/82.1 |
| 3,270,728 | 9/1966 | Mizuno | 123/102 |
| 3,392,799 | 7/1968 | Ishikawa | 180/105 |
| 3,476,204 | 11/1969 | Westby et al. | 180/98 |
| 3,476,205 | 11/1969 | Kato | 180/105 |
| 3,547,216 | 12/1970 | Marie | 180/107 |
| 4,112,885 | 9/1978 | Iwata et al. | 123/98 |
| 4,187,734 | 2/1980 | Mann | 74/405 |
| 4,192,398 | 3/1980 | Hunt | 180/178 |
| 4,212,272 | 7/1980 | Hawk | 123/339 |
| 4,237,742 | 12/1980 | Barthruff | 74/89.19 |
| 4,304,202 | 12/1981 | Schofield | 123/376 X |
| 4,360,089 | 11/1982 | Matsui et al. | 74/781 R |
| 4,401,077 | 8/1983 | Earl | 123/376 |

*Primary Examiner*—Rodney H. Bonck
*Attorney, Agent, or Firm*—Robert E. McCollum; Clifford L. Sadler

[57] ABSTRACT

An automotive type carburetor throttle valve actuator is automatically moved within two ranges to provide an idle speed control and a vehicle speed control; the moving mechanism including a compound planetary gear set operatively conditioned for a reduction drive to establish a slowly changing idle speed drive range, and conditioned for a direct drive to establish a faster changing vehicle speed level control range; a microprocessor sensing engine operating conditions for determining the operation of a reversible electric motor and a gear reaction member and clutching mechanism to determine the operating range as well as the speed level change.

5 Claims, 3 Drawing Figures

CARBURETOR THROTTLE VALVE ACTUATOR

This invention relates in general to a motor vehicle carburetor. More particularly, it relates to an actuator for moving a carburetor throttle valve in a dual mode to regulate the idle speed of the engine during one mode, and to regulate the speed of the vehicle by regulating the engine off idle speed during a second mode.

Devices are known in the prior art for automatically regulating the idle speed of an automotive type engine to maintain it at a set level regardless of the operability or inoperability of accessories, such as, for example, an air conditioning compressor or power steering pump.

U.S. Pat. No. 4,212,272, Hawk, shows and describes gearing connected to a motor vehicle throttle valve that is intermittently driven by a motor energized in response to sensors to maintain a predetermined engine idle speed.

U.S. Pat. No. 2,929,369, Staege, shows a mechanical regulation of a fuel pump to maintain a predetermined idling operation.

Devices are also known for regulating the speed of the vehicle during engine off idle operating conditions to maintain a chosen highway speed level.

U.S. Pat. No. 4,192,398, Hunt, shows a screw and nut combination controlled by an intermittently operated motor to position the engine throttle, or the rack of a fuel injection pump, to provide a speed control type of operation.

U.S. Pat. No. 3,270,728, Mizuno, shows an electrically driven gearing connected to a carburetor throttle valve to control the position of the same to maintain the vehicle at a set speed.

U.S. Pat. No. 3,392,799, Ishikawa, shows gearing driven by a motor electrically controlled to provide a desired constant speed level.

U.S. Pat. No. 2,973,051, Teetor, illustrates the use of a screw and nut combination to effect the angular movement of a member to maintain the speed of a motor vehicle at a desired level.

U.S. Pat. No. 4,187,734, Mann, also shows motor driven gearing to provide a speed control function for a motor vehicle.

U.S. Pat. No. 4,237,742, Barthruff, U.S. Pat. No. 4,112,885, Iwata et al, U.S. Pat. No. 3,547,216, Marie, U.S. Pat. No. 3,476,205, Kato, and U.S. Pat. No. 3,476,204, Westby et al, are further illustrations of electrical controlled positioners for the throttle valve of a motor vehicle to maintain a constant speed level.

While the above known devices provide constructions that control either the engine idle speed levels, for a particular purpose, or the engine off idle speed levels, for a different purpose, none show a construction providing both controls in a unitary construction. This invention relates to a throttle valve actuator that provides a dual mode of operation; i.e., two ranges of movement, one controlling the position of the carburetor throttle valve during an engine idle speed range of movement, and the second controlling the throttle valve between engine off idle and fully wide open positions.

More particularly, it is an object of this invention to provide a carburetor throttle valve actuator consisting of a compound planetary gear drive means that is selectively conditioned for a reduction drive to provide a varying idle speed range of operation, or conditioned for a direct drive lockup to provide operation in a vehicle speed control or engine off idle speed range, the output from the gear means being operatively connected to the throttle valve of the carburetor in a manner to provide the speed level control desired.

It is a still further object of the invention to provide a throttle valve actuator of the type described having a fail-safe return movement of the actuator to the engine idle speed mode of operation upon discontinuance of the speed control mode.

Figure 2:
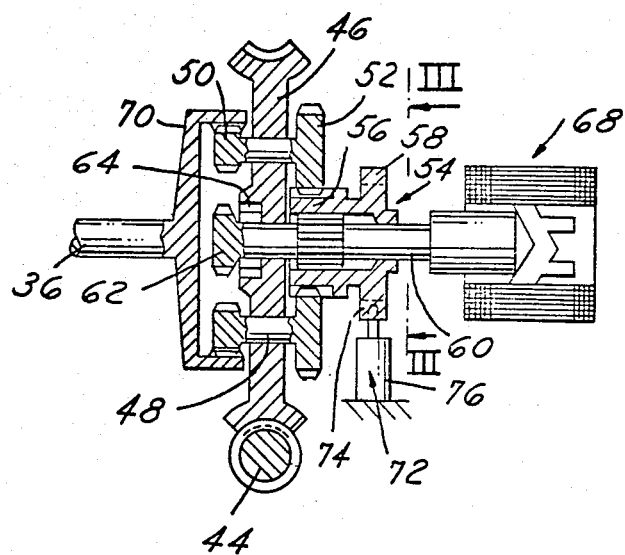
Figure 3:
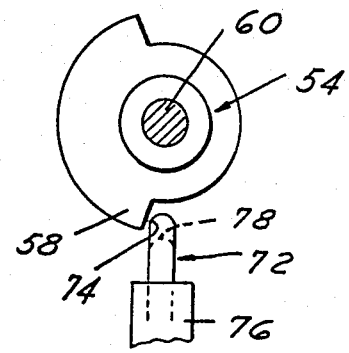

Other objects, features and advantages of the invention will become more apparent upon reference to the succeeding detailed description thereof, and to the drawings illustrating the preferred embodiment thereof; wherein, FIG. 1 is a perspective view of an engine carburetor throttle valve actuator embodying the invention;

FIG. 2 is a cross-sectional view of a portion of the actuator illustrated in FIG. 1; and, FIG. 3 is a cross-sectional view taken on a plane indicated by and viewed in the direction of the arrows III—III of FIG. 2.

FIG. 1 shows schematically a portion 10 of an automotive type engine carburetor. It has the usual induction passage 12 for the flow of an air/fuel mixture from the conventional air cleaner, not shown, to the engine intake manifold, also not shown. The flow is controlled by a throttle plate or valve 14 that is fixed for rotation to a shaft 16 rotatably mounted in the walls of the carburetor. The throttle valve moves in the usual manner from an essentially closed position across induction passage 12 to an essentially vertical wide open throttle position.

Throttle shaft 16 is fixed to an actuator lever 18 having a pair of oppositely projecting ear portions 20 and 22. Lower portion 20 is pivotably connected to an actuating rod 24 connected at its opposite end to a bell crank lever 26 fulcrumed at 28. The lower portion of lever 26 is pivoted to a conventional vehicle accelerator pedal 30 that is adapted to be actuated by the vehicle operator in the usual manner. Depression of accelerator pedal 30 will pivot levers 26 and 18 to move open throttle valve 14 in the counterclockwise direction indicated by arrow 32.

The upper portion 22 of lever 18 has a one-way connection to an L-shaped actuator 34 that is fixed for rotation with a shaft 36. The connection permits movement of lever 18 by the vehicle accelerator pedal 30 in a counterclockwise direction independently of lever 34 to open throttle valve 14 while preventing independent rotation of lever 18 in the opposite clockwise direction.

Shaft 36 is rotated by a compound planetary gear set 40 that is driven by a selectively and intermittently actuated reversible type electric motor 42. More specifically, motor 42 is drive connected to a worm gear 44 that in turn drives a bull gear 46. The latter rotatably mounts a plurality (only one shown in FIG. 1) of planet gear shafts 48 to which are fixed planet gears or pinions 50 and 52 of different diameters. Planet pinions 50 mesh internally with a ring gear 70 from which extends shaft 36. Planet gears 52 mesh with a combination sun gear-reaction member 54 that includes a sun gear 56 and a cam type reaction member 58.

As best seen in FIG. 2, the combination gear 54 is internally splined for slidably receiving therein a shaft 60. One end of the shaft is formed with one part 62 of a clutching mechanism, the other portion 64 being formed integral with bull gear 46. The opposite end 66 of shaft 60 is formed as the armature of an electromagnet or solenoid 68 that is selectively energized in a manner to be described. Armature 66, in the deenergized condition of solenoid 68, is spring biased to disengage clutch portions 62 and 64, as shown. When the solenoid is energized, shaft 60 moves rightwardly as seen in FIG. 2 to engage the clutch portions 62 and 64 to lock the gearing for rotation as a unit.

Completing the construction, a retactable stop or reaction member 72 (FIG. 3) is spring biased to project into the path of movement of reaction member 58 in a counterclockwise direction to be engaged by its cammed abutment surface 74 to thereby hold the combination sun-cam member against rotation in this direction. Member 72 is electrically connected to a solenoid or similar type actuator 76 to be retracted to the dotted line position 78 when the solenoid is actuated to thereby free sun gear 54 for rotation in the direction of arrow 38 when the gear set is locked up for a direct drive.

In operation, the fail-safe position of the parts is as shown in FIGS. 1 and 2. The conventional throttle valve closing spring, not shown, normally associated with a vehicle accelerator pedal, exerts a clockwise closing force on throttle valve 14, as indicated by arrow 80 in FIG. 1, to the essentially closed idle speed position. At the same time, deenergization of solenoid 68 and actuator 76 will position reaction member 78 in the stop position shown in FIG. 3 and shaft 60 in the clutch disengaged position shown in FIG. 2. Accordingly, if throttle valve 14 is not already in the idle speed range of movement, counterclockwise rotation of shaft 36 by the throttle valve closing spring will rotate ring gear 70 and planet gears 50 and 52 in the same direction. This will drive sun gear 54 counterclockwise causing cam surface 74 to engage reaction member 78. Continued rotation of shaft 36 in this direction will then cause the planet pinion shafts 48 to walk around or planetate in a clockwise direction around stationary sun gear 54 thereby driving bull gear 46, worm gear 44 and motor 42 in a reverse or clockwise direction.

The planetary gearing now will be conditioned for the idle speed range of movement between the essentially closed throttle valve position now attained and a selected idle speed position. The ring gear 70 would contain an encoder, not shown, to automatically sense the rotative position of the ring gear and thus throttle valve 14. A signal or nonsignal would be relayed by the encoder to a microprocessor or similar type device scheduled to activate or deactivate motor 42 to position the throttle valve in a particular location for any particular operating condition of the engine.

Assume, for example, that the engine is running and a particular engine idle rpm is desired to be maintained. If an air conditioning compressor is put into operation, a drop in engine idle speed would be sensed by the microprocessor, which then would activate reversible motor 42 to open throttle valve 14. Solenoids 66 and 76 would remain deenergized to locate stop 72 outwardly. Therefore, clockwise rotation of worm gear 44 would drive bull gear 46 in a counterclockwise direction to rotate the planet carrier shafts 48 in the same direction. Initially, the friction load on ring gear 70 would cause it to act as a reaction member thereby causing rotation of planet gears 50 and 52 by bull gear 46 in a clockwise direction. As a result, the combination sun gear-reaction member 54 would be driven in a counterclockwise direction until edge 74 engages stop 72. The direction of rotation of the planet gears 50 and 52 would then reverse to a counterclockwise direction thereby driving ring gear 70 and output shaft 36 in the same direction but at a speed reduced from that of bull gear 46.

Accordingly, as best seen in FIG. 1, counterclockwise rotation of actuator 34 would move lever portion 22 of lever 18 in the same direction and open throttle valve 14 in the direction indicated by arrow 32. Once the sechedule idle speed rpm level is attained, the microprocessor would then stop motor 42. If an overrun occured, motor 42 would be reversed to close down the throttle valve 14 to the correct opening. It will be clear that the idle speed range of movement will be within a narrow band sufficient to maintain a desired idle speed for both cold (fast or high idle) and warm (normal idle) engine operations.

When the vehicle operator wishes to operate the vehicle in the speed control range of movement beyond the engine idle speed range, the operator would program the microprocessor for that particular speed range operation. The microprocessor would energize solenoids 68 and 76 to withdraw stop 72 and engage clutch parts 62, 64. Shaft 60 then would move rightwardly, as seen in FIG. 2, to engage both parts of the clutch 62, 64 and thereby connect sun gear 54 directly to bull gear 46. This locks up the gearset for a direct drive movement of all of the gearing as a unit. Thereafter, clockwise rotation of worm gear 44 by motor 42 would cause a counterclockwise rotation of all of the gearing and output shaft 36. This would be permitted by the reaction cam 54 being freely rotatable by the withdrawal of reaction stop 72 to the dotted line position 78 indicated. Continued rotation of movement 42, therefore, would continuously and progressively open throttle valve 14 to increase the engine and vehicle speed to a chosen level set by the operator. When this particular speed level is reached, the reversible motor 42 would be stopped and throttle valve 14 maintained in the position attained. It will be clear, again, of course, that any overrun of the speed level as indicated by the position of throttle valve 14 would be sensed by the encoder on ring gear 70, and motor 42 would be reversed to return the throttle valve 14 to the proper position.

From the foregoing, it will be seen that the invention provides an engine carburetor throttle valve actuator that can automatically establish two ranges of control of the engine speed, either to provide a slowly changing speed range to maintain a set engine idling speed, or a second faster and wider range of movement beyond the engine idle speed level to the wide open throttle condition of operation, by the use of a compound planetary gear set operating either in reduction or direct drive conditions, and sensed by the position of an encoder on the output gear of the planetary gear set. It also will be clear that the mechanism described causes the planetary gearing to be fail-safe in operation in that it returns to the reduction drive idle speed mode in the event of a failure of the electrical system.

While the invention has been shown and described in its preferred embodiment, it will be clear to those skilled in the arts to which it pertains that many changes and modifications may be made thereto without departing from the scope of the invention.

I claim:

1. A motor vehicle throttle valve actuator for controlling the opening of the throttle valve in a first speed control range of movement between the idle speed and wide open throttle valve positions, and a second idle speed range of movement between an essentially closed throttle valve position and a fast idle throttle valve speed position; comprising, compound planetary gear drive means operatively coupled to said throttle valve for moving said valve through said ranges, holding means operably engagable with a member of the gear means to effect a reduction drive operation of the throttle valve in the second range, and clutching means for locking up the planetary gear drive means to effect operation of said throttle valve through said first range.

2. An actuator as in claim 1, said drive means including a planetary gearset including sun, planet and ring gears and a planet carrier, motor means for driving the planet carrier, and means connecting the ring gear to the throttle valve, the holding means holding the sun gear against rotation.

3. An actuator as in claim 2, the clutching means being rotatable with the sun gear and movable into engagement with the carrier to effect rotation of all of the gear members as a unit.

4. An actuator as in claim 1, the planetary gear means including a power output ring gear, a sun gear, a planet gear shaft having first and second planet gears of different diameter thereon, the first planet gear meshing with the ring gear, the second planet gear meshing with the sun gear, and a planet shaft carrier power input member for driving the planet gear shaft, the holding means holding the sun gear against rotation during inoperability of the clutching means, the clutching means being rotatable with the sun gear, and power means to render operable the clutching means to engage the sun gear and the planet shaft carrier for a unitary drive of the ring gear at the speed of the input carrier.

5. An actuator as in claim 4, including an output shaft connecting the output ring gear to the throttle valve for rotating the valve between open and closed positions, and one-way means connecting the output shaft and throttle valve permitting movement of the throttle valve in an opening direction independently of the movement of the output shaft.

* * * * *